Patented July 10, 1945

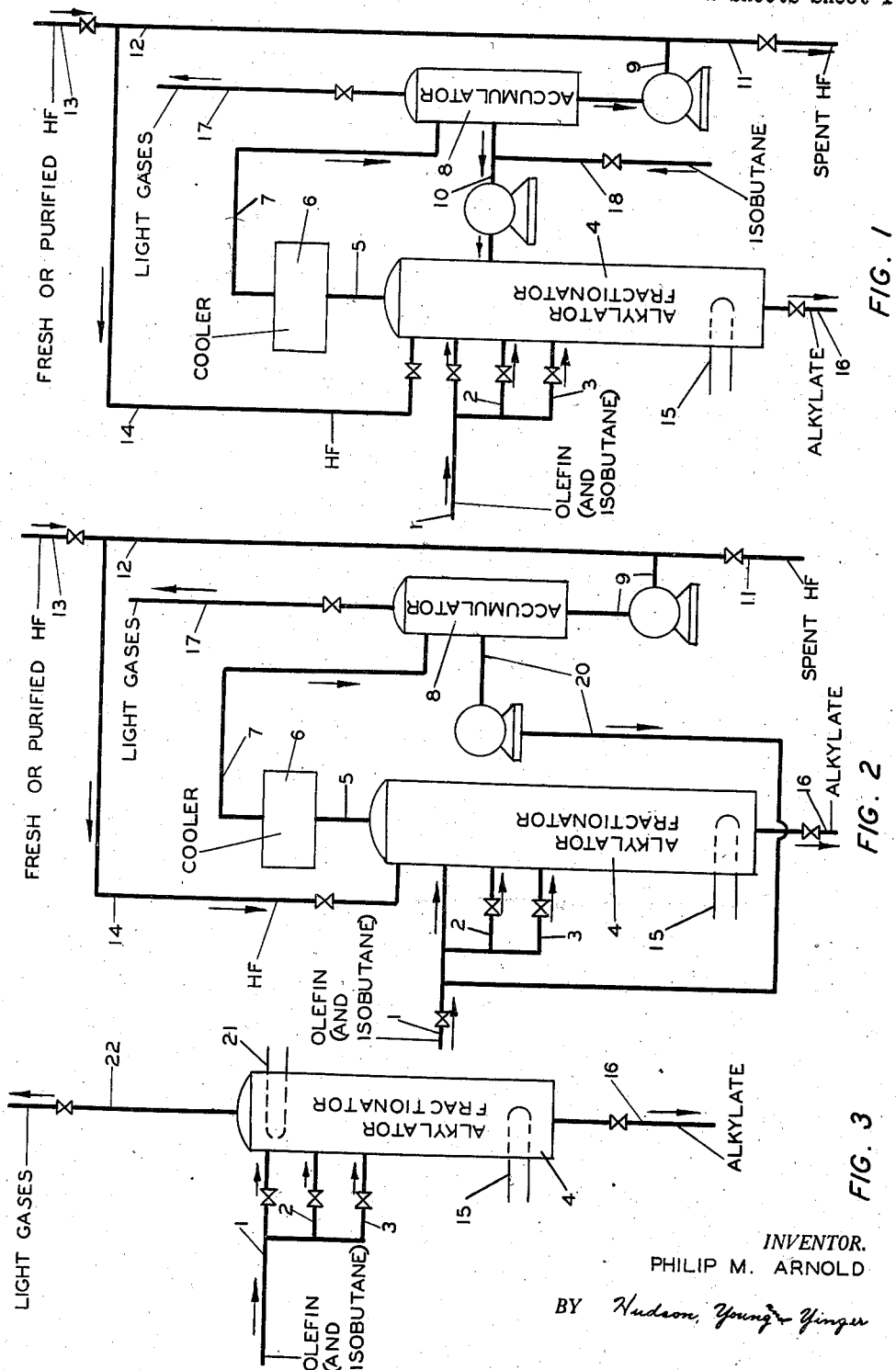

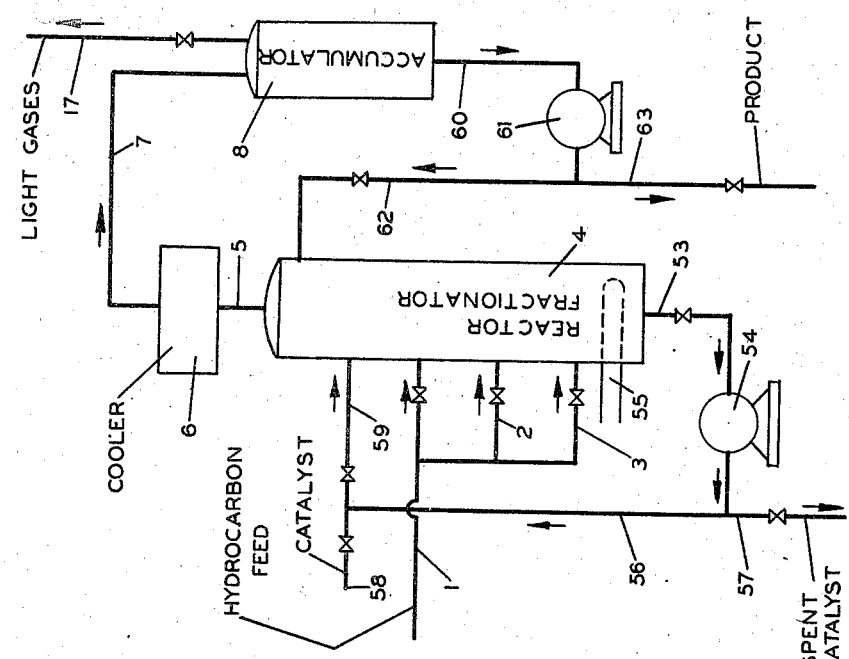
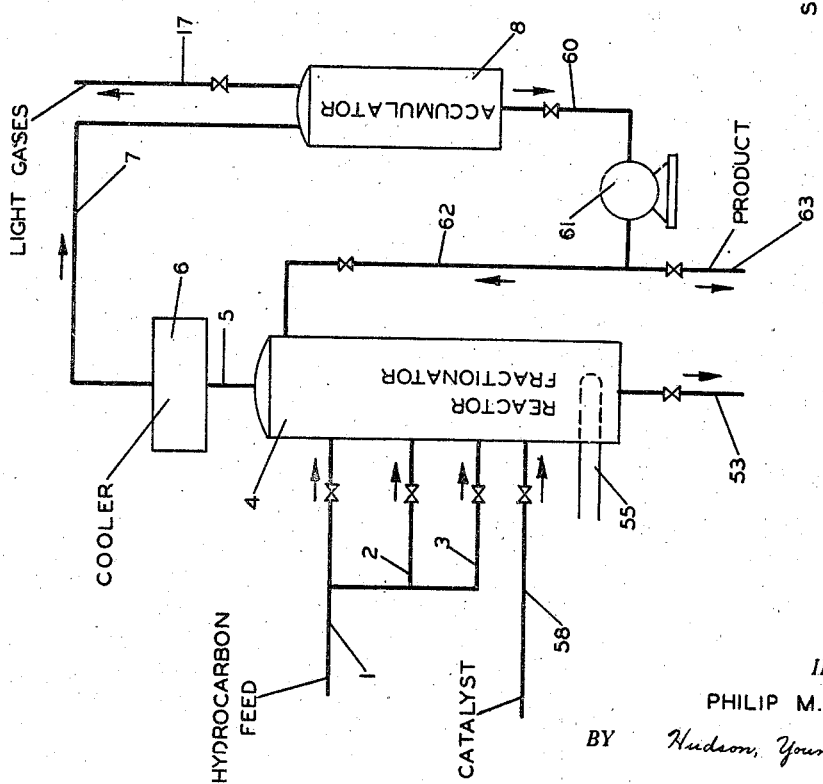

2,380,010

UNITED STATES PATENT OFFICE 2,380,010

HYDROCARBON CONVERSION

Philip M. Arnold, Bartlesville, Okla., assignor to Phillips Petroleum Company, a corporation of Delaware Application December 4, 1942, Serial No. 467,870

4 Claims. (Cl. 260—683.4)

This invention relates to a method whereby catalytic hydrocarbon conversions employing liquid or liquefied catalysts readily separable from the conversion reaction effluents either by distillation or by two phase liquid separation, especially anhydrous hydrogen fluoride, can be conducted in a fractionating tower. Thus the expense of contactors, reactors, etc., ordinarily employed in processes of this kind is eliminated.

More particularly the invention relates to a method whereby a hydrocarbon conversion can be effected with a catalyst consisting of essentially anhydrous hydrogen fluoride in a fractionating tower. The invention is particularly adaptable to alkylation and isomerization of light hydrocarbons of the order of 3 to 6 carbon atoms per molecule, especially aliphatic hydrocarbons, namely, paraffins and olefins. The invention is especially applicable in the alkylation of low-boiling isoparaffins ($C_4$ to $C_6$) with low-boiling aliphatic olefins ($C_3$ to $C_6$) particularly isobutane with olefins, especially isobutylene, and also in the isomerization of low-boiling paraffins to the corresponding branched chain forms particularly normal butane to isobutane.

The usual steps in carrying out hydrocarbon conversion reactions in liquid phase with a liquid or liquefied catalyst are (1) to contact the catalyst with the hydrocarbons to be converted under reaction conditions, (2) to separate the catalyst from the reaction effluents by fractionation if the effluents are miscible with the catalyst or by settling steps and subsequent fractionation if the catalyst is not completely miscible with the reaction products, and (3) to recycle a portion of the catalyst to the reaction zone while the remaining portion is being treated to revivify or concentrate the catalyst. Normally at least one fractionation step would be devoted to the recovery of the catalyst from the hydrocarbon effluent products from the reaction zone. Subsequent fractionations would be devoted to the isolation of the desired hydrocarbons. In accordance with the present invention the fractionation step normally employed for the separation of the catalyst from the conversion zone effluents is used as the reaction step as well as for separating the catalyst from the reaction zone mixture. Thus the contactors, settlers, etc., ordinarily employed prior to the catalyst separation step are eliminated.

The principal object of the present invention is to provide an improved process of carrying out hydrocarbon conversions catalyzed with liquid catalysts. Another object is to provide an improved process of carrying out alkylation of isoparaffins with aliphatic olefins using liquid catalyst. Still another object is to provide an improved process of carrying out alkylation of isobutane with aliphatic olefins using liquid anhydrous hydrogen fluoride. Another object is to provide a process of the foregoing type wherein the conversion is carried out in a fractionating column, thereby eliminating the amount of expensive equipment required and simplifying the apparatus and control of the process. Numerous other objects will hereinafter appear.

The accompanying drawings portray five arrangements of apparatus that may advantageously be employed in carrying out the process of the present invention. The several figures will be explained in detail below.

In accordance with the present invention, a hydrocarbon conversion catalyzed with a liquid catalyst, which may be either normally gaseous and employed in the liquefied condition, one which is normally liquid, or one which is normally solid and employed in the liquid state, is conducted by continuously feeding the hydrocarbons to be converted, at a single point or a plurality of points, into a fractionating column. This column is equipped with reboiling means at its bottom for reboiling the material approaching the bottom whereby only the heavy components of the mixture are withdrawn as the bottom fraction. The column is so operated that simultaneous fractionation or rectification and the convertive reaction occur in the body of the column. The top of the column is refluxed either by provision of a partial or total condensing coil in association with the top of the column or by recycling suitable liquefied components of the overhead vapors. A vaporous overhead is continuously withdrawn from the top of the column and this may consist essentially of light non-condensible gases where total condensation was provided or of a vaporized hydrocarbon, or of a vaporized catalyst, or of a mixture of a hydrocarbon component or components and catalyst. From the bottom of the column there is continuously withdrawn a heavy reboiled fraction which may or may not comprise mainly the product sought. In some cases the product is contained in the overhead from which it is recovered by suitable means hereinafter disclosed. The withdrawal of material from the column takes place at essentially the same rate as that at which material is fed into the column, after steady state operation is established, whereby a balance is obtained.

Of course, the column is packed with the usual means for insuring intimate contact between vapor and gas, such as trays or bubble plates, Raschig rings, etc.

The process outlined in the foregoing is especially applicable in the alkylation of isoparaffins with low-boiling aliphatic olefins. In such case it may be preferred, when using a volatile catalyst such as liquid anhydrous hydrogen fluoride or other liquid catalyst which is more volatile than the alkylate, to withdraw as the overhead a vaporous mixture consisting essentially of the isoparaffin and the catalyst, condensing this overhead, mechanically treating the condensate to separate a hydrocarbon-rich phase and a catalyst-rich phase, returning the hydrocarbon phase to the top of the column to serve as reflux, and also returning a portion of the catalyst phase to the column to serve as catalyst. The heavy fraction removed as the bottom product consists essentially of the alkylate product.

An especially preferred mode of effecting the alkylation of isobutane with olefins using anhydrous HF as the catalyst involves feeding a stream containing the olefin, with or without a part of the isobutane, into the column at a plurality of vertically spaced points. Preferably isobutane is present in the olefin feed in amount only sufficient to replace that consumed in the alkylation. The tower, however, is so operated that the isobutane is in excess over the olefin throughout the column. The amounts of the olefin stream fed into the column at each point are individually adjusted so that this excess of isobutane is maintained at each point in the column. Since the concentration of isobutane increases from the bottom to the top of the column, this means that relatively large amounts of the olefin are introduced at the higher of the several points, progressively decreasing as the column is descended. The make-up isobutane may be introduced in admixture with the refluxed isobutane instead of in the olefin feed, if desired. Or the make-up isobutane may be introduced at any other point in the column.

In order that the invention will be more readily understood, it will first be described with respect to its application to the alkylation of isobutane with olefins using liquid anhydrous hydrogen fluoride as the catalyst. However, the invention may equally well be applied to the isomerization of normal butane, or other hydrocarbon conversion reactions. Figure 1 is a diagrammatic sketch of the invention as applied to the alkylation of isobutane with olefins. Referring to Figure 1, olefins such as propylene, butylenes, amylenes, etc., and isobutane in suitable proportions are introduced as feed to fractionator 4 through line 1 and branch lines 2, 3, etc. In fractionator 4 the feed is contacted with liquid anydrous hydrogen fluoride which is introduced near the top of fractionator 4 through line 14. The alkylate produced and admixed isobutane, olefins, hydrogen fluoride, etc., are reboiled by reboil arrangement 15 to effect the separation of these diluents from the alkylate which is the bottom product of fractionator 4. The alkylate is removed from the bottom of fractionator 4 through line 16. The unconverted hydrocarbons, consisting mostly of isobutane, separated from the alkylate pass upwardly through column 4 where they are again subjected to conversion conditions. The overhead product consisting essentially of isobutane and hydrogen fluoride leave tower 4 through line 5, condenser 6, and line 7 to enter accumulator 8. In accumulator 8 the liquefied overhead product from fractionator 4 separates into two liquid phases, the upper phase being rich in hydrocarbon and the lower layer or phase being rich in hydrogen fluoride. The hydrocarbon-rich phase, which is mostly isobutane, is returned to fractionator 4 as reflux by means of line 10. The hydrogen fluoride-rich phase is removed from accumulator 8 by means of line 9 to enter branched lines 11 and 12. The portion of the hydrogen fluoride entering line 12 is recycled to column 4 through line 14. The portion of the hydrogen fluoride from line 9 entering branch line 11 is removed from the system to an acid purification system (not shown) for the removal of any water, acid soluble side reaction products, etc., that may have accumulated in the hydrogen fluoride during the course of the hydrocarbon conversion. The purified acid is returned to the system through line 13 connecting with line 14. Line 13 may also be provided with means for supplying make-up acid to replace any lost from the system. Light hydrocarbons which are formed in the conversion process or are included in the feed stream may accumulate in the system. To remove these non-condensible gases it may be necessary to draw a gas stream from the accumulator 8 through line 17.

In alkylation processes it is generally desirable to supply an excess of the paraffin hydrocarbon, in this case isobutane, in order to dilute the olefin and thus reduce side reactions such as polymerization, halogenation, decomposition, etc., of the olefin. Usually, it is desirable to maintain a given paraffin to olefin ratio. Consequently, fractionator 4 of Figure 1 is supplied with multiple feed points 1, 2, 3, etc. Controls are provided for varying the rate of flow through these feed points. By means of these controls the amount of olefin to isobutane can be regulated to within a given ratio over a relatively large portion of the fractionating column. At the top of the column where the hydrogen fluoride and isobutane concentrations are high, a large amount of olefin can be introduced. Lower down in the column, where the concentration of isobutane is lower by reason of its consumption by the alkylation reaction and because of the fractionating effect of the tower, the controls can be set to introduce smaller quantities of olefin containing feed than at the top to maintain the isobutane-olefin ratio desired. It is to be noted that if the feed is an olefin-isobutane mixture, only enough isobutane is introduced with the olefin feed to replace that consumed in the conversion reaction. The excess isobutane to maintain the desired paraffin-olefin ratio is continuously recycled to the fractionating column as reflux. If the feed to the column does not contain isobutane, the isobutane consumed in the reaction may be introduced through line 18.

Another modification of the invention is shown in Figure 2. This modification resembles the process of Figure 1 except that the hydrocarbon phase in the reflux accumulator is introduced into the column with the feed by means of line 20. Thus in this case as in Figure 1, once the desired excess of paraffin is charged to the column 4, it is only necessary to supply enough isobutane to replace that consumed by the conversion reaction or lost from the system. As in Figure 1, light hydrocarbons introduced with the feed or formed in the reaction are removed as gases from the accumulator 8 via line 17.

Figure 3 portrays a modification wherein a dephlegmating type condenser 21 is used. In such an arrangement the overhead product is totally condensed and refluxed to the fractionator, except for light (non-condensible) gases which are removed through line 22. In the operation of this modification of the invention, the catalyst (anhydrous HF) and excess isobutane are kept in the fractionating tower and are not withdrawn therefrom. The required amount of isobutane to react with the olefins is fed into the tower with the olefins through lines 1, 2, 3, etc. Dephlegmator 21 totally condenses the overhead product except for a small amount of light non-condensible gases which may be fed in with the feed or may be formed in the reaction. The condensate returns to the column. Because of the total reflux, no isobutane or catalyst escapes overhead from the system. In this operation there is formed very little or no spent catalyst because any complexes formed are broken by the high temperatures at the bottom of the column. The catalyst (HF) is charged to the column at the start of the operation and kept therein until the column is shut down.

The foregoing modifications have been described with respect to their application to the alkylation of hydrocarbons using anhydrous hydrogen fluoride as the catalyst. The process may also be employed to effect other types of hydrocarbon conversion reactions using other liquid catalysts which may be miscible or partially miscible with the hydrocarbons involved. For the case where the catalyst is less volatile than the hydrocarbons involved, a modification such as is shown in Figures 4 or 5 will be necessary. In this modification the hydrocarbons are removed overhead and, if desired, fractionated to separate the unconverted hydrocarbons which may be returned to the reaction zone. If desired, multiple points of feed introduction with individual means for control may be used with modifications such as shown in Figures 4 and 5 in order to permit introducing feed volumes in accordance with catalyst concentration in the various parts of the column. The modification shown in Figure 4 is useful for catalysts of high boiling point that cannot be reboiled except at temperatures which might result in undesirable decomposition of the feed and reaction products. Line 53, pump 54, and lines 56 and 59 are provided to recycle the catalyst to the upper section of the column. There must be a sufficient number of trays above line 59 to reflux the catalyst and prevent it passing off overhead with the reaction products.

Examples of liquid catalysts which are less volatile than HF and which typify the catalysts contemplated in the preceding and in the succeeding paragraphs are: sulfuric acid, phosphoric acid, mixtures of sulfuric and phosphoric acids, liquid addition compounds of boron fluoride and phosphoric acid, boron fluoride and lower aliphatic alcohols such as ethyl alcohol, boron fluoride and lower fatty acids such as acetic acid, etc.

The apparatus of Figures 4 and 5 may also be used for processes wherein heavy hydrocarbons are decomposed to obtain lighter ones such as catalytic splitting (carbon-to-carbon scission), catalytic reconstruction (disproportionation), etc. In such processes the catalyst and heavy hydrocarbons are reboiled in the column and light reaction products are taken off overhead. Referring to Figure 4, the heavy hydrocarbon feed to be converted by decomposition is charged as before to column 4 through line 1 and branch lines 2, 3, etc. In column 4 the heavy hydrocarbon is contacted with a catalyst introduced through lines 58 and 59. Since the boiling point of the catalyst may be considerably higher than the desired reaction temperature, the catalyst concentration is maintained throughout the column by recycling the catalyst through line 53, pump 54 and lines 56 and 59. The portion of the column above line 59 serves as a fractionating section. Spent or poisoned catalyst is withdrawn from the system through line 57 to be revivified or disposed of. Fresh or revivified catalyst is introduced through line 58. The reaction products consisting of light hydrocarbons are drawn off overhead through line 5, cooler 6, and pass through line 7 to accumulator 8. A portion of the liquid from accumulator 8 is returned to the column through line 60, pump 61 and line 62 as liquid reflux. The remaining portion is drawn off as the product through line 63 to further processing, storage, etc. Reboiler 55 is provided in the bottom of column 4 to effect reboiling of the kettle contents.

The apparatus of Figure 5 is similar to that shown in Figure 4 except that the catalyst is not recirculated by pumping. In this case the catalyst should be sufficiently volatile to permit reboiling and thus causing some of it to ascend as vapor into the column where it will be condensed and flow back down as liquid. The catalyst is a material heavier than any of the reactants or products. An example where this operation may be used is the polymerization of propylene to form hexylene using titanium tetrachloride as a catalyst. However this is only an example and is not intended to limit the possibilities for this operation. The selection of a liquid catalyst meeting the requirements for this type of operation will be well within the skill of the art in the light of this specification.

In instances where compounds, which have about the same volatility characteristics as the reactants and catalyst, but which are not reactive under the conditions in the fractionation-reaction zone, are produced in or fed to the reaction zone there will be a tendency for such products to accumulate in the reaction zone. For example, in the case of alkylation of isobutane with olefins using anhydrous hydrogen fluoride as the catalyst, if there is any normal butane present in the isobutane-olefin feed it will tend to accumulate in the fractionator-reaction zone. Normal butane is relatively inactive so far as alkylation with olefins in the presence of hydrofluoric acid as a catalyst is concerned. Consequently, it is not consumed in the reaction to produce products of different characteristics as is isobutane. This results in the normal butane being recycled with the excess isobutane in the fractionator-reactor, but since it is not consumed it steadily accumulates. No provision is indicated on the drawings for overcoming such a difficulty. However, this difficulty can be overcome by allowing the normal butane or other similar unreactive product to accumulate to some predetermined level and withdrawing it either as a side stream from the fractionating column or from the overhead accumulator at a rate equal to that at which the undesirable product is produced in or fed to the reaction zone. Withdrawal in the form of a side stream from the fractionating column is preferable. If desired, the side stream may be subjected to fractionation to recover any catalyst or desired hydrocarbons contained in the side stream, and suitable portions of the side stream may be returned to the reaction zone.

I claim:

1. The process of alkylating isobutane with low-boiling aliphatic olefins employing liquid anhydrous hydrogen fluoride as the alkylation catalyst which comprises continuously feeding a stream comprising the olefin into the upper portion of a fractionating column equipped with a reboiler, introducing said stream at a plurality of vertically spaced points in the upper portion of said column, including in said stream isobutane in amount just sufficient to replace that consumed in the alkylation reaction, maintaining an excess of isobutane over olefin throughout the column, individually adjusting the amount of said olefin fed into the upper portion of said column at each of said vertically spaced points in such manner as to maintain an excess of isobutane over olefin throughout the column, simultaneously fractionating the mixture and effecting catalytic alkylation of the isoparaffin with the olefin in said column, reboiling the mixture approaching the bottom of said column and thereby effecting separation of isobutane, olefin and hydrogen fluoride from the alkylate, continuously withdrawing from the bottom of said column a heavy fraction consisting essentially of alkylate, continuously withdrawing from the top of said column an overhead fraction consisting essentially of isobutane and hydrogen fluoride, condensing said overhead, effecting separation of the condensate into a liquid hydrocarbon phase comprising chiefly isobutane and a hydrogen fluoride phase, returning all of said liquid hydrocarbon phase to the top of said column as reflux therefor, and returning at least a part of said hydrogen fluoride phase to said column to furnish catalyst for said alkylation.

2. The process of alkylating isoparaffins with aliphatic olefins with an alkylating catalyst consisting essentially of liquid anhydrous hydrogen fluoride which comprises continuously feeding a stream of the isoparaffin and the olefin into the upper portion of a fractionating column equipped with reboiling means, said stream containing isoparaffin in amount just sufficient to replace that consumed in the alkylation taking place in the column, maintaining isoparaffin in excess over olefin throughout the column, maintaining liquid anhydrous hydrogen fluoride in the column in amount sufficient to catalyze the alkylation, simultaneously fractionating the mixture and effecting catalytic alkylation of the isoparaffin with the olefin in said column, reboiling the mixture approaching the bottom of said column and thereby freeing the alkylate bottom product from lighter materials including isoparaffin, olefin and catalyst, condensing all isoparaffin attaining the top of the column and returning all of the condensed isoparaffin to the top of the column as reflux therefor, and withdrawing from the bottom of said column a heavy fraction consisting essentially of the alkylate formed therein.

3. The process of alkylating isoparaffins with low-boiling aliphatic olefins with an alkylation catalyst consisting essentially of liquid anhydrous hydrogen fluoride which comprises continuously feeding a stream comprising the olefin into the upper portion of a fractionating column equipped with reboiling means, introducing said stream at a plurality of vertically spaced points in the upper portion of said column, including in said stream isoparaffin in amount just sufficient to replace that consumed in the alkylation reaction, maintaining an excess of isoparaffin over olefin throughout the column, individually adjusting the amount of said olefin fed into said column at each of said vertically spaced points in such manner as to maintain an excess of isoparaffin over olefin throughout the column, reboiling the mixture approaching the bottom of said column and thereby effecting separation of isoparaffin, olefin and hydrogen fluoride from the alkylate, continuously withdrawing from the bottom of said column a heavy fraction consisting essentially of the alkylate, and totally condensing the overhead product attaining the top of said column except for light non-condensible gases, and refluxing the column with the entire condensate.

4. The process of alkylating isoparaffins with aliphatic olefins with a catalyst consisting essentially of liquid anhydrous hydrogen fluoride which comprises continuously passing a stream of the isoparaffin and the olefin into the upper portion of a fractionating column equipped with reboiling means, said stream containing isoparaffin in amount just sufficient to replace that consumed in the alkylation taking place in the column, simultaneously feeding a stream of said catalyst into the upper portion of said column, maintaining isoparaffin in excess over olefin throughout the column, simultaneously fractionating the mixture and effecting catalyic alkylation of the isoparaffin with the olefin in said column, reboiling the mixture approaching the bottom of said column and thereby freeing the alkylate bottom product from lighter materials including isoparaffin, olefin and catalyst, continuously withdrawing a vaporous overhead consisting essentially of isoparaffin and catalyst from the top of said column, condensing said overhead, treating the resulting condensate to separately recover an isoparaffinic phase and a liquid catalyst phase, returning all of said isoparaffinic phase to the top of said column as reflux therefor, recycling at least a portion of said catalyst phase to said column, and withdrawing from the bottom of said column a heavy fraction consisting essentially of the alkylate formed therein.

PHILIP M. ARNOLD.